(12) United States Patent
Sicard et al.

(10) Patent No.: US 7,593,645 B2
(45) Date of Patent: Sep. 22, 2009

(54) OPTICAL TRANSMITTER

(75) Inventors: Stephane Sicard, Ipswich (GB); Ian Mitchell, Ipswich (GB); Neil James Parkin, Ipswich (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 457 days.

(21) Appl. No.: 11/259,424

(22) Filed: Oct. 26, 2005

(65) Prior Publication Data

US 2006/0093378 A1 May 4, 2006

(30) Foreign Application Priority Data

Oct. 29, 2004  (GB)  ................ 0424017.2

(51) Int. Cl.
*H04B 10/04* (2006.01)
*H01S 3/00* (2006.01)

(52) U.S. Cl. ................ 398/182; 372/38.02; 372/38.07
(58) Field of Classification Search ................ 398/182, 398/195, 198, 201; 372/38.02, 38.07
See application file for complete search history.

(56) References Cited

U.S. PATENT DOCUMENTS

| 5,777,761 | A | * | 7/1998 | Fee ................ 398/7 |
| 5,938,309 | A | * | 8/1999 | Taylor ................ 398/79 |
| 2002/0005967 | A1 | * | 1/2002 | Suzuki ................ 359/124 |
| 2003/0063290 | A1 | | 4/2003 | Kathman et al. ........... 356/521 |
| 2005/0002671 | A1 | * | 1/2005 | Smith et al. ................ 398/83 |

* cited by examiner

*Primary Examiner*—Nathan M Curs

(57) ABSTRACT

The present invention provides an optical transmitter comprising one control unit and a plurality of optical sources. Control signals are multiplexed and de-multiplexed as appropriate to enable control of all optical sources by the control unit.

4 Claims, 2 Drawing Sheets

OPTICAL TRANSMITTER

BACKGROUND

This invention relates to optical transmitters, and in particular to optical transmitters incorporating a plurality of laser devices.

Optical communications networks are now conventional in long distance communications networks and are becoming more commonplace for inter-office communication networks, LANs, etc. Typically, these networks tend to be characterised by having a high density of short-length network links.

FIG. 1 shows a schematic depiction of a conventional laser driver for use in an optical transmitter (or combined optical transmitter/receiver). Driver control unit 10 comprises control logic 12, first and second digital-analogue converters (DACs) 14, 15 and first and second analogue-digital converters (ADCs) 16, 17. The driver control unit is connected to the transmitter unit 20, which comprises laser diode 22 and monitor system 24. The monitor system is connected to the second DAC via a low pass filter (LPF) 32 and power monitor 34.

In use, the control logic 12 receives data from a network component (not shown) and determines the signals that need to be sent to the laser diode 22 in order for the appropriate optical signal to be launched into optical fibre 40. This is achieved by sending a bias current, which controls the state of operation of the laser diode, and a modulation current, which causes the laser to emit appropriate pulses to form the desired '0' and '1' optical signals. The bias current signal and the modulation current signal are sent to first and second DACs 14, 15 respectively and the analogue currents are then sent to the laser diode.

The laser diode 22 emits an optical signal in accordance with the bias and modulation currents into the optical fibre 40. The monitor system 24 detects this optical signal and generates an electrical signal that is indicative of the optical signal launched into the optical fibre. A portion of this electrical signal is fed through a low pass filter 32 and then to the first ADC 16, the output of which is connected to the control logic. The control logic can interpret the digitised output of the LPF to determine the power output of the laser diode. The other portion of the electrical signal is passed to a power monitor, the output of which is connected to the second ADC 17. The control logic uses this signal to monitor the modulation and the extinction ratio of the laser. The control logic uses these feedback inputs to vary the bias and modulation current signals to obtain the desired optical desired signals.

The drive arrangement shown in FIG. 1 is required for each laser transmitter used in a communications network. It will be readily appreciated that as the number of laser transmitters used in a network grows, there will be issues associated with the space required for the driver circuits, the amount of electrical power required to operate them, the amount of heat that must be dissipated from the equipment and the cost of the driver circuitry.

SUMMARY

According to a first aspect of the present invention there is provided an optical transmitter comprising a plurality of optical sources, each of the optical sources being configured to be in optical communication with an optical fibre, the transmitter further comprising one control unit for generating a composite control signal comprising a plurality of component signals characterised in that each of the plurality of optical sources is operated in accordance with one or more component signals.

The optical transmitter may further comprise one or more demultiplexers received intermediate the control unit and the plurality of optical sources, the one or more demultiplexers receiving the composite control signal and separating the composite control signal into the plurality of component signals.

The advantage of the present invention is that a single control unit may be used to control a plurality of optical sources, such as a laser. This is in contrast to known optical transmitters in which one control unit is required to control each laser in the transmitter. By reducing the number of control units it is possible to reduce the cost, size, power consumption and heat dissipation of the transmitter. Whilst the use of a single control unit will result in the use of additional multiplexers, etc, the components that are added tend to be less complex and cheaper than the control units that are being replaced and thus the advantages of the present invention will still be provided.

The present invention may further comprise one or more signalling processing means received intermediate the demultiplexer(s) and the plurality of optical sources wherein, the signalling processing means receives a plurality of discontinuous component signals from the demultiplexer(s) and outputs a plurality of continuous component signals to the plurality of optical sources. The transmitter may also further comprise a switching means, the switching means arranged to distribute the plurality of component signals from the demultiplexer(s) to the optical source associated with each of the plurality of component signals.

Furthermore each of the plurality of optical sources may comprise a respective feedback means, each of the feedback means being configured to generate a feedback signal indicative of the operation of the respective optical source. The plurality of feedback means may be in communication with the control unit and the optical transmitter may further comprise a multiplexer to generate a composite feedback signal from the feedback signal generated by the plurality of feedback means.

BRIEF DESCRIPTION OF DRAWINGS

The invention will now be described, by way of example only, with reference to the following Figures in which.

DETAILED DESCRIPTION

Figure 2:
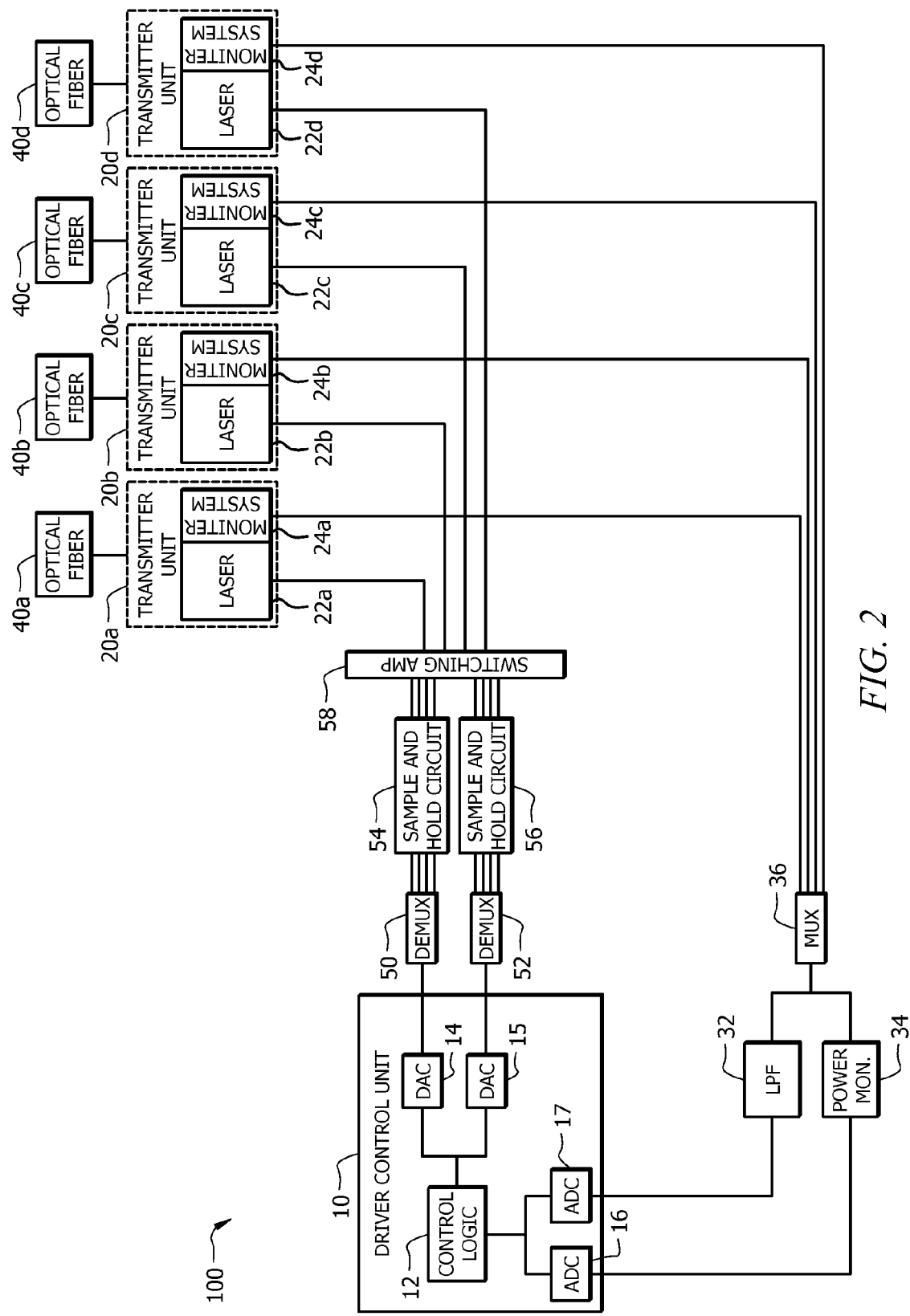
FIG. 2 shows a schematic depiction of a laser driver for use with multiple lasers according to the present invention.

FIG. 2 shows a schematic depiction of a laser driver 100 for use with multiple lasers (in this case FIG. 2 shows the laser driver being used to control four lasers but it will be understood that the number of lasers is not critical to the operation of the present invention and that the invention could be implemented using a greater or lesser number of lasers).

Laser driver 100 comprises driver control unit 10, which comprises control logic 12, first and second DACs 14 and 15 and first and second ADCs 16 & 17. The first DAC 14 is connected to first demultiplexer 50, which is in turn connected to first sample and hold circuit 54. Similarly, the second DAC 15 is connected to the second demultiplexer 52, which is connected to second sample and hold circuit 56. The sample and hold circuits are connected to a switching amplifier 58 that is in turn connected to a plurality of transmitter units 20a, 20b, 20c & 20d. Each of the transmitter units comprises a laser diode 22a, 22b, . . . and a monitor system 24a, 24b, . . . , and each of the transmitter unit is aligned to launch optical signals into a respective optical fibre 40a, 40b, . . . . The monitor systems are connected to a multiplexer 36 which has outputs connected to LPF 32 and power monitor 34; the output of the LPF 32 is connected to second ADC 17 and the output of the power monitor is connected to the first ADC 16.

The control logic module 12 sends a first digital signal to the first DAC 14, which converts the digital signal into multiplexed analogue signals representing the bias current for each of the four transmitter units 20a-d. A second digital signal is sent to the second DAC 15, which converts the digital signal into multiplexed analogue signals representing the modulation current for each of the four transmitter units 20a-d. The multiplexed bias current signal is sent to first demultiplexer 50, which demultiplexes the multiplexed bias current signal to extract four discrete bias current signals. Assuming the use of time-division multiplexing, then each of the discrete bias current signals will have a duty cycle of 0.25 (if guard bands are used during the multiplexing of the signal then the duty cycle will be further reduced). To provide a continuous bias current to each transmitter unit, the four discrete bias current signals are passed to sample and hold circuit 54, the output of which is four continuous bias current signals. The magnitude of each signal is determined by the magnitude of the sample received most recently by the sample and hold circuit 54. The four continuous bias current signals are outputted from sample and hold circuit 54 to the switching amplifier 58.

In a similar manner, a multiplexed modulation current signal is sent to second demultiplexer 52 to generate four discrete modulation current signals. These discrete modulation current signals are sent to sample and hold circuit 56, resulting in the sample and hold circuit 56 outputting four continuous modulation current signals to the switching amplifier 58.

The switching amplifier 58 switches the incoming continuous bias and modulation current signals such that the bias and modulation signals associated with each of the transmitter units 20a, . . . are switched to the respective transmitter unit. The signals may be amplified if required, and a feedback loop to the control logic may be provided to allow the level of amplification to be controlled. Each of the transmitter units 20a, . . . receives their respective bias and modulation currents and the respective laser diodes 22a, . . . emit optical signals into the respective optical fibres 40a, . . . .

Figure 1:
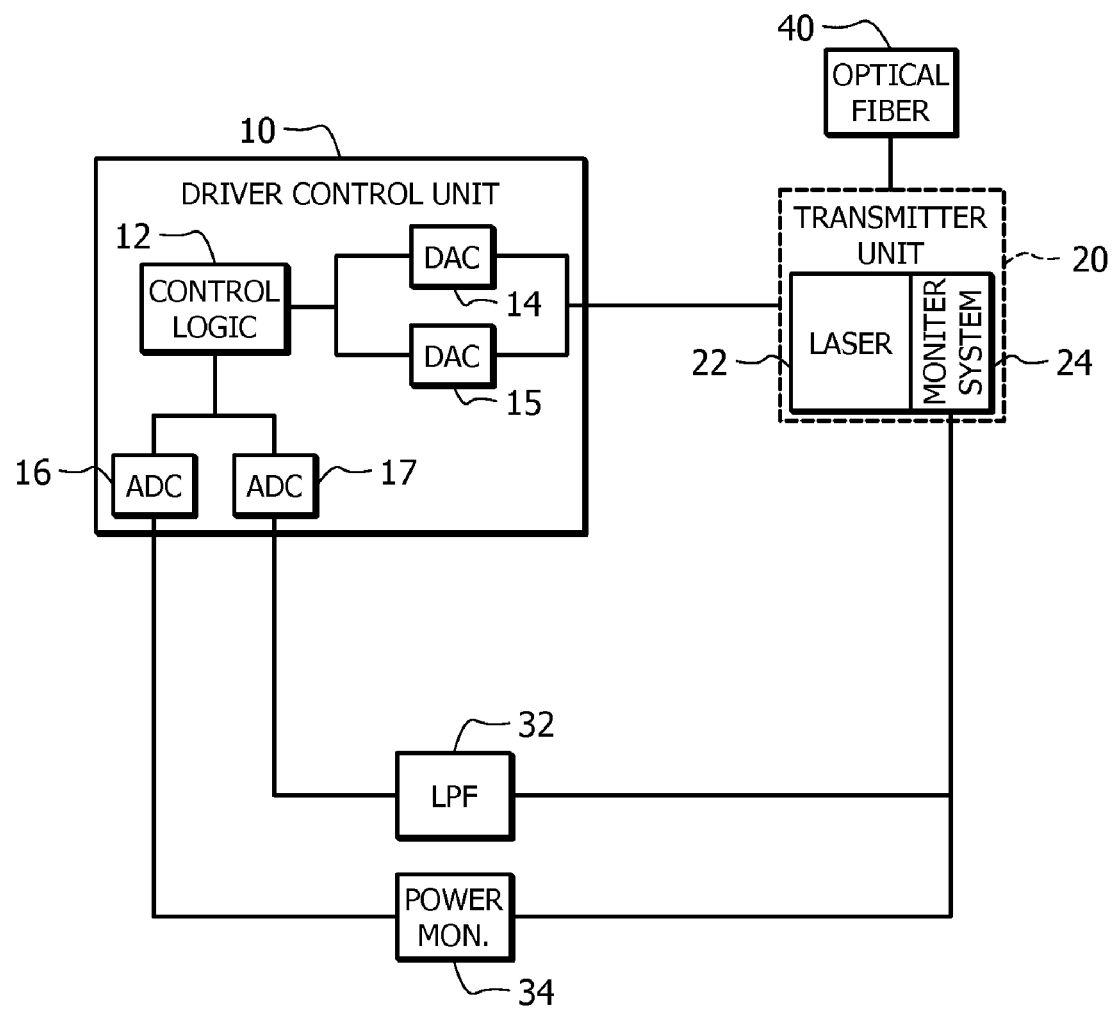
FIG. 1 shows a schematic depiction of a known laser driver for use in an optical transmitter.

Similarly to the arrangement of FIG. 1, each of the optical fibres 40a, . . . has an associated monitor system 24a, 24b, . . . , that detects the magnitude of the optical signal launched into the respective optical fibre and generates an electrical signal that is indicative of the detected optical signal. The electrical signals from each of the monitor systems 24a, 24b, . . . , are fed to multiplexer 36. The multiplexer multiplexes the different monitor signals and then passes the multiplexed signal to the LPF 32 and power monitor 34. The output of the LPF is connected to the second ADC 17 and the output of the power monitor is connected to the first ADC 16. Both the first and second ADCs are connected to the control logic. The control logic can interpret the signals received from the LPF and the power monitor to determine the bias current and extinction ratio for each of the laser diodes. This enables the control logic to monitor the performance of the laser diodes and to alter accordingly any control signals that are sent to one or more of the laser diodes.

It will be readily understood that the invention could be implemented in a different manner without departing from the scope of the present invention. It should be understood that the foregoing description is focused on the functionality of the components used to implement the invention and the invention could be implemented using different components that provide similar or identical functionality to the components described above.

For example, first and second demultiplexers 50, 52 may be replaced with a single demultiplexer, and similarly the sample/hold circuits 54, 56 may be replaced with a single such circuit. Furthermore, or alternatively, the sample/hold circuit(s) may also provide signal amplification and the switching amplifier 58 may be just a simple switch. A further alternative is to use two switching amplifiers, with one amplifier receiving the signals outputted from sample/hold circuit 54 and the other amplifier receiving the signals outputted from sample/hold circuit 56.

It will also be understood that although the above discussion has been focused on the use of a single control unit to control a plurality of lasers, the optical transmitter may comprise a first plurality of control units and a second plurality of lasers that are being controlled by the first plurality of control units. If the second plurality of lasers is greater than the first plurality of control units then the advantages provided by the present invention will still be realised.

The invention claimed is:

1. An optical transmitter comprising:
    a plurality of transmitter units, each transmitter unit having an optical source adapted to provide an optical signal to an optical fiber;
    a driver control unit for controlling a bias current and a modulation current for each of the optical sources, the driver control unit adapted to generate a digital composite bias current signal and a digital composite modulation current signal;
    a digital-to-analog converter adapted to convert the digital composite bias current signal into a first multiplexed analog signal including a discrete bias current signal for each of the optical sources, and further adapted to convert the digital composite modulation current signal into a second multiplexed analog signal including a discrete modulation current signal for each of the optical sources; and
    a demultiplexer adapted to extract the discrete bias current signals from the first multiplexed analog signal and extract the discrete modulation current signals from the second multiplexed analog signal.

2. The optical transmitter of claim 1, further comprising a sample and hold circuit adapted to receive each of the discrete bias current signals and generate a corresponding continuous bias current signal, and further adapted to receive each of the discrete modulation current signals and generate a corresponding continuous modulation current signal.

3. The optical transmitter of claim 1, wherein one or more of the optical sources comprise a laser diode.

4. The optical transmitter of claim 1, wherein each optical source has a corresponding monitor system for providing feedback to the driver control unit.

* * * * *